(12) United States Patent
MacInnis (10) Patent No.: US 8,140,818 B2
(45) Date of Patent: *Mar. 20, 2012

(54) METHOD AND SYSTEM FOR SCALABLE VIDEO DATA WIDTH

(75) Inventor: Alexander Garland MacInnis, Lake Oswego, OR (US)

(73) Assignee: Broadcom Corporation, Irvine, CA (US)

(*) Notice: Subject to any disclaimer, the term of this patent is extended or adjusted under 35 U.S.C. 154(b) by 22 days.

This patent is subject to a terminal disclaimer.

(21) Appl. No.: 12/763,627

(22) Filed: Apr. 20, 2010

(65) Prior Publication Data

US 2010/0205388 A1 Aug. 12, 2010

Related U.S. Application Data

(63) Continuation of application No. 11/057,460, filed on Feb. 14, 2005, now Pat. No. 7,702,878, which is a continuation of application No. 10/850,130, filed on May 20, 2004.

(60) Provisional application No. 60/472,182, filed on May 21, 2003.

(51) Int. Cl.
*G06F 12/00* (2006.01)
*G06F 13/00* (2006.01)

(52) U.S. Cl. ......... 711/173; 711/100; 711/154; 711/200
(58) Field of Classification Search .................. 711/100, 711/154, 173, 200, 202; 725/127
See application file for complete search history.

(56) References Cited

U.S. PATENT DOCUMENTS

| 5,956,741 A | 9/1999 | Jones |
| 2004/0083495 A1 | 4/2004 | Lane |

*Primary Examiner* — Tuan V. Thai
(74) *Attorney, Agent, or Firm* — Thomas, Kayden, Horstemeyer & Risley, LLP (57) ABSTRACT

Processing data samples may comprise partitioning the data samples in a first set of data bits and a second set of data bits and utilizing at least some of the first and second set of data bits while operating under a first condition. Only at least some of the first set of data bits may be utilized while operating under a second condition. The first condition may be a normal operating condition, while the second condition may be a performance restricted condition. The first set of data bits may be more significant bits and the second set of bits may be less significant bits. At least some of the first and second set of data bits may be utilized while bandwidth is available. Under the second condition, other values may be substituted for the data values from the second set that were not read in a read operation.

45 Claims, 4 Drawing Sheets

METHOD AND SYSTEM FOR SCALABLE VIDEO DATA WIDTH

CROSS-REFERENCE TO RELATED APPLICATIONS/INCORPORATION BY REFERENCE

This application makes reference to, claims priority to, and claims the benefit of U.S. Provisional Application Ser. No. 60/554,703, filed Mar. 19, 2004.

This application also makes reference to U.S. application Ser. No. 11/057,460, filed Feb. 14, 2005, which is a continuation of U.S. application Ser. No. 10/850,130, filed May 20, 2004, which claims priority to U.S. Provisional Application Ser. No. 60/472,182, filed May 21, 2003.

The above stated applications are hereby incorporated herein by reference in their entirety.

FIELD OF THE INVENTION

Certain embodiments of the invention relate to processing of video signals. More specifically, certain embodiments of the invention relate to a method and system for scalable video data width.

BACKGROUND OF THE INVENTION

In some conventional video processing systems that perform compression and/or decompression of digital video, one or more pictures (or frames or fields) of video are generally stored in memory such as dynamic random access memory (DRAM). Video data in DRAM is typically stored in a format that may be system and/or implementation dependent. Among other things, pictures stored in DRAM are utilized for motion-compensation prediction (MCP), which is also referred to as motion compensation (MC). Motion compensation involves reading many arrays of values from DRAM and processing data read from the DRAM in order to produce predicted sample values. These predicted values may be utilized during video decompression.

With the evolution of new digital video standards, video compression formats are continuously evolving. One of the most commonly utilized video formats is MPEG-2 (ISO/IEC 13818-2). A next generation offshoot of the MPEG-2 standard, which is likely to become widespread, is MPEG-4 AVC, also known as ITU H.264 (ISO/IEC 14496-10), and referred to as "AVC." Decoding and encoding of AVC is much more demanding than MPEG-2 in terms of DRAM access performance, mainly because AVC uses motion compensation that is more complex than that used by MPEG-2. AVC is evolving with extensions proposed for 10 bit-per-pixel video samples (10-bit video) and 12 bit-per-pixel video samples (12-bit video) compared to the current standard of 8 bits-per-pixel (8-bit video). The use of 10-bit video increases DRAM performance requirements, partially because of the increased number of bits per pixel, and because of the inefficiency of packing 10 bits per sample into DRAM data words whose widths are generally powers of 2 (e.g., 16, 32, 64, 128). In other words, it may be more efficient to pack samples that are powers of two (2) into DRAM data words that it is to pack samples that are not powers of two (2).

Along with this trend towards increased demands on DRAM performance requirements, there is also a trend to integrate more functions on one chip, particularly in devices such as decoders that are utilized in high volume applications such as, cable and satellite set top boxes, and also digital television receivers and other broadband access devices. These highly integrated chips are often referred to as Systems-On-Chip (SOCs). Many of the functions combined on one chip, for example, the decoding of digital video, have real time requirements for DRAM performance.

As real time DRAM requirements increase, it becomes increasingly more difficult to design systems in which all real time demands are met by sharing access to DRAM. For instance, many successful designs use a unified memory architecture (UMA), in which one DRAM system supports DRAM access needs of all functions on a chip. In particular, extending the decoding performance of digital video decoding functions on large SOCs with UMA such that the video decoder may be expected to decode 10-bit digital video, leads to problems with DRAM real time performance.

In typical decoding systems, the real time performance of the DRAM subsystem tends to vary dynamically. The performance tends to vary in response to varying demands from the video decoding operations as well as other functions such as graphics, audio, and networking function, for example. A well-designed system is generally designed to operate reliably under instantaneous worst-case conditions. However, except for those worst-case conditions, normal operating conditions may not be as demanding as the instantaneous worst-case conditions.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for implementing scalable video data width, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to processing of digital video signals and may include compression and/or decompression of digital video signals, also referred to as coding or encoding, and decoding, respectively. The present invention also relates to other forms of signal processing operations, which may involve data reads from a memory and data writes to a memory, where such memory access may be constrained by real time processing requirements. For example, the present invention may be applicable to graphics processing and audio processing.

In an embodiment of the present invention, data samples with more than a baseline number of bits per sample, may be arranged such that the baseline more significant bits of each sample (MSBs) may be organized in an efficient manner in DRAM. For example, for video data samples, the baseline may be 8 bits. However, data samples containing more than 8 bits, for example, 10 bits, may be stored in DRAM to be processed by a video decoder. In instances where 10 bits are utilized, for example, the original portion of the 10 bits that make up the baseline, that is 8 bits, may be referred to as the more significant bits (MSBs). The remaining 2 bits may be referred to as the less significant bits (LSBs). In accordance with an embodiment of the invention, the more significant bits and the least significant bits may be organized into separate DRAM words.

When decoding, for example, 10-bit video, under typical conditions the decoder may read and write both the more significant bits and the less significant bits as appropriate to perform the expected video processing operations. However, in certain instances, for example, when the real time performance demands imposed by the video processing operations on the DRAM system may be in conflict with other demands on DRAM, the processing operations may omit either the reading or writing of the LSBS, but not the more significant bits of the samples. In one aspect of the invention, one such combination may comprise writing the MSBs and the LSBs while reading only the MSBs under constant conditions. In such instances, the processing operations may be performed as if the less significant bits had been read and written as appropriate. The less significant bits that would normally have been read or written, were it not for the conflict, may be temporarily stored. In the case of a write operation, these less significant bits may be written to DRAM after the conflict ceases. In the case of a read or write operation, these less significant bits may be stored but may not be subsequently read. For example, these less significant bits may be stored in a memory such as a DRAM. In this regard, these less significant bits may be referred to as being discarded. In one embodiment of the invention, other values may be utilized to supplement the more significant bits in order to compensate for the loss of the less significant bits that would have been written to DRAM or read from DRAM. These other values may be internally generated or alternate values to use in place of the data values that were not read from the memory. For example, to compensate for the less significant bits that were not read, a predefined or newly assigned value may be utilized for those bits.

Figure 1A:
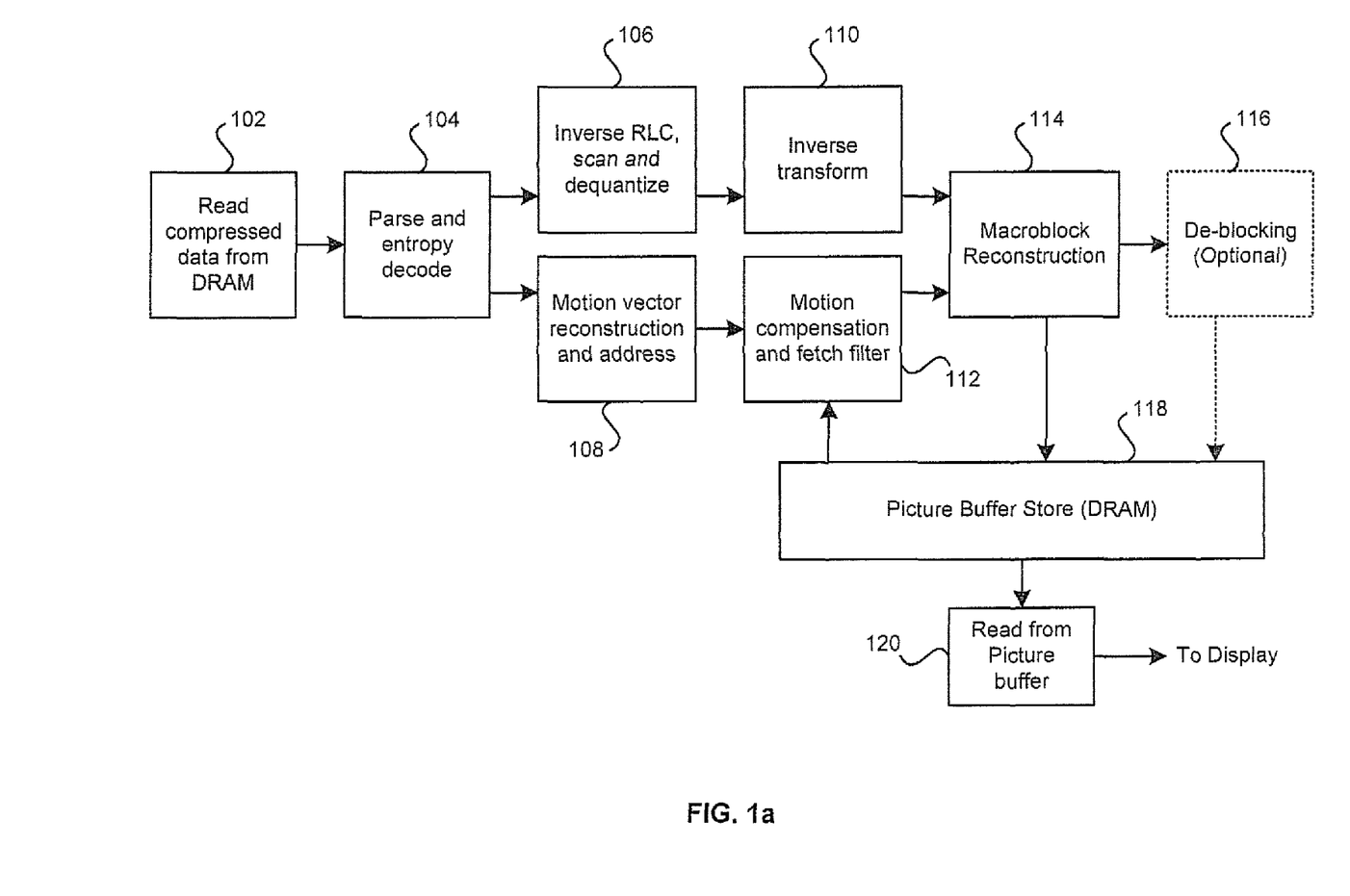
FIG. 1a is a flow diagram that illustrates exemplary data flow for a video decoder in accordance with an embodiment of the invention.

FIG. 1a is a flow diagram that illustrates exemplary data flow for a video decoder in accordance with an embodiment of the invention. Referring to FIG. 1a, at 102, compressed data may be read from DRAM. At 104, a data structure representing a portion p of a picture may be parsed from the read compressed data and entropy decoded. At 106, inverse run level code (RLC), inverse scan, and de-quantization may be applied to the picture. At 110, inverse transformation may be applied, resulting in a decoded prediction error p' (read as p prime). The prediction error may be combined with a predicted portion p. In one case the portion p is predicted from another picture. Alternatively, the portion p may be predicted from the current picture.

In the case where the portion p is predicted from another picture, at 108, the motion vector data may be examined. The motion vector data may be examined to determine the location and size of the segment r from a reference picture that is utilized to predict portion p. At 112, the portion r may be fetched from the picture buffer 118, and processed to form predicted portion p. Although not shown, in the case where the portion p is predicted from the current picture, this prediction may be performed at 112. At 114, the predicted portion p is combined with the prediction error p' to form reconstructed portion q. At 116, de-blocking may be applied to the portion q. The portion q may be stored in the picture buffer 118. In 120, pictures may be read from the picture buffer 118 for display.

The picture buffer 118 stores the pictures to await display as well as, in some cases, for reference. At 112, the picture buffer 118 may be accessed with the address of the segment r. The pixels may be arranged in the picture buffer 118 so as to reduce the maximum total number of DRAM cycles required to decode and display each picture. In an embodiment of the invention, the picture buffer 118 preferably comprises DRAM with 16 byte words known as giant words (Gwords). The picture buffer 118 may have a word size of 128 bits or 16 bytes and in this regard, one word may be mapped to 8 horizontally adjacent luma pixels in 2 rows, for example. Notwithstanding, the invention may not be so limited and accordingly, other word sizes and mappings may be utilized without departing from the various aspects of the invention.

Figure 1B:
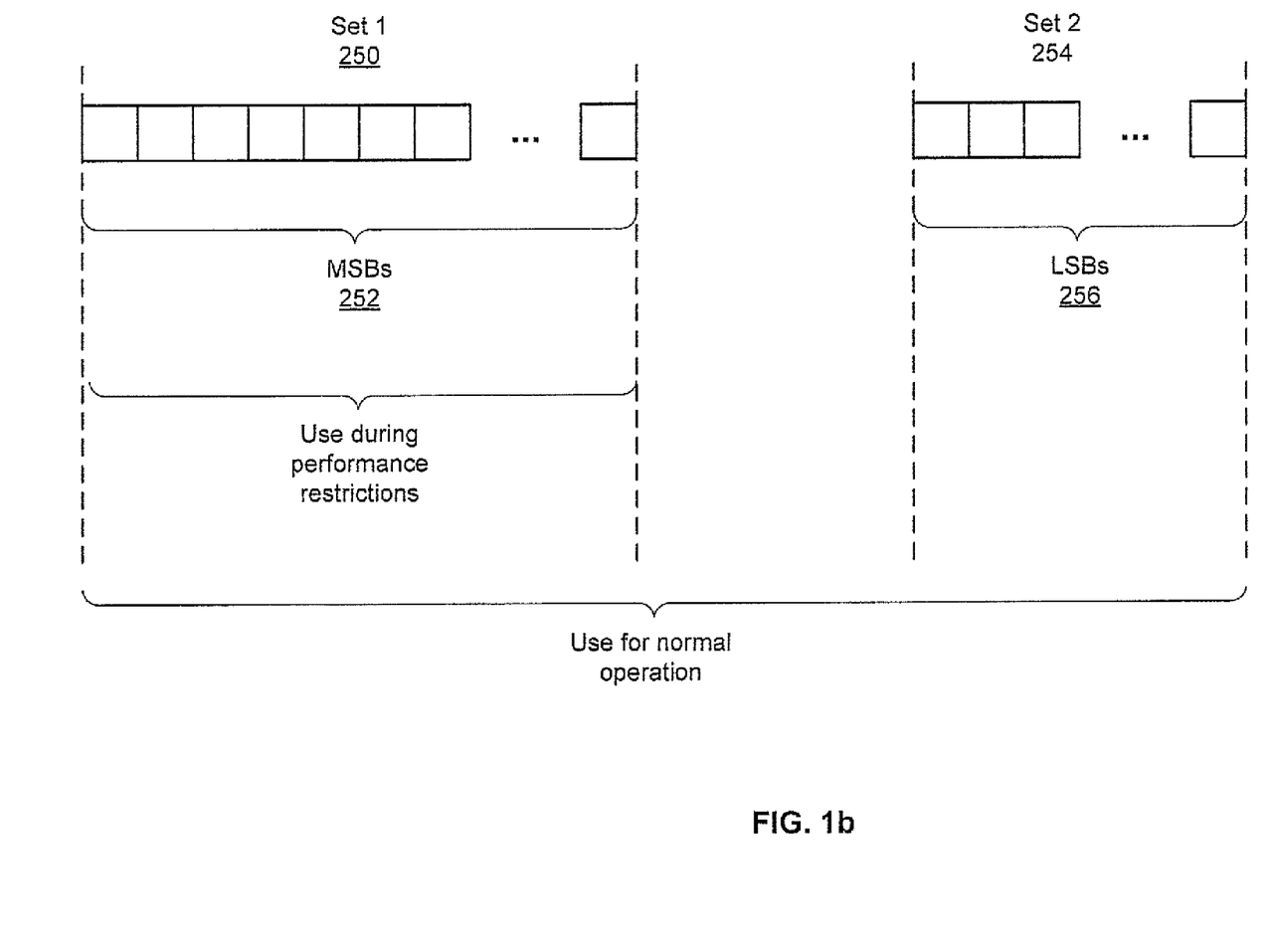
FIG. 1b is a diagram illustrating an exemplary embodiment of more significant bits and less significant bits in accordance with an embodiment of the invention.

FIG. 1b is a diagram illustrating an exemplary embodiment of more significant bits and less significant bits in accordance with an embodiment of the invention. Referring to FIG. 1b, there is shown a first set of data bits 250 and a second set of data bits 254. The first set of data bits 250 is the baseline that represents the more significant bits (MSBs) 252. The second set of data bits 254 represents the less significant data bits 256 (LSBs). In an exemplary embodiment of the invention, during normal operation, the more significant bits (MSBs) 252 and less significant data bits 256 (LSBs) may be utilized. However, whenever there is a performance restriction, the baseline or more significant bits (MSBs) 252 may be utilized.

U.S. application Ser. No. 10/850,130, filed May 20, 2004, which claims priority to U.S. Provisional Application Ser. No. 60/472,182 filed May 21, 2003, discloses an exemplary mapping of words in a picture buffer and is hereby incorporated herein by reference in its entirety. In that case, the word size is 128 bits and a single word is mapped to 8 horizontally adjacent luma pixels in 2 rows, e.g., $Y_{00}, Y_{01}, \ldots Y_{07}, Y_{20}, Y_{21}, \ldots Y_{27} \ldots$ picture. For chroma pixels, one word may be mapped to four horizontally adjacent chroma red pixels Cr, and the four horizontally adjacent chroma blue pixels Cb that are co-located with the four horizontally adjacent chroma red pixels Cr, e.g., $Cr/Cb_{00}$, $Cr/Cb_{02}$, . . . $Cr/Cb_{06}$, $Cr/Cb_{20}$, $Cr/Cb_{22}$, . . . $Cr/Cb_{26}$. Two rows of horizontally adjacent luma pixels are consecutive alternating rows within a frame, for example, rows 0 and 2 for luma pixels. The consecutive alternating rows are adjacent rows from the same field. Two rows of horizontally adjacent chroma pixels are also consecutive alternating rows, for example, rows 0 and 4 in a 4:2:0 format, and rows 0 and 2 in a 4:2:2 format.

The decoder of FIG. 1a may be adapted to decode compressed video, where the compressed video stream represents video pictures whose samples are specified to have bits per component greater than a baseline number of bits per component. The baseline number may be eight (8), or a different number such as, for example, 4, 5, 6, 7, 8, 9, 10, etc. In a case where the baseline number of bits is eight (8), the video with the greater number of bits may be, for example, a 10-bit video, although the number of bits per component may be 9, 10, 11, 12 or any number greater than the baseline. The baseline bits may be referred to as the more significant bits (MSBs), and the additional bits may be referred to as the less significant bits (LSBs).

Figure 2:
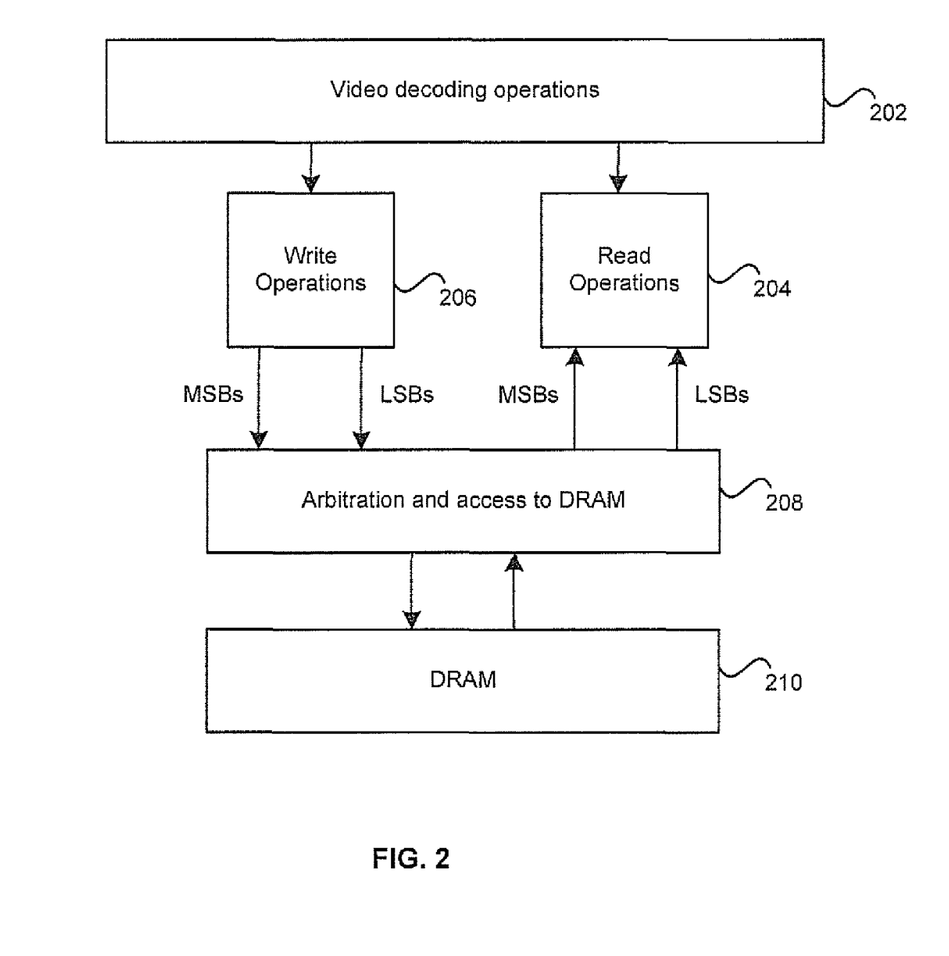
FIG. 2 is a block diagram that may be utilized to illustrate an exemplary separation of the motion compensation into more significant bits (MSBs) and less significant bits (LSBs) when accessing DRAM, in accordance with an embodiment of the present invention.

FIG. 2 is a block diagram that may be utilized to illustrate an exemplary separation of the motion compensation into more significant bits (MSBs) and less significant bits (LSBs) when accessing DRAM, in accordance with an embodiment of the present invention. Referring to FIG. 2, there is shown video decoding operations block 202, write operations block 206, read operations block 204, an arbitration and access to DRAM block 208 and a DRAM block 210.

The arbitration and access DRAM block 208 may be adapted to arbitrate access to DRAM 210 among a plurality of processing resources or applications. In this regard, the arbitration and access to DRAM block 208 may include suitable logic, circuitry and/or code that may be adapted to resolve any arbitration conflicts that may arise due to the write operations block 204 and the read operations block 206 and possibly other operations that may also be contending for DRAM access. The arbitration and access to DRAM block 208 may also be adapted to control whether the more significant bits, the less significant bits, or both the more significant bits and the less significant bits are written to DRAM 210 by the write operations operation block 204. The arbitration and access to DRAM block 208 may also be adapted to control whether the more significant bits, the less significant bits, or both the more significant bits and the less significant bits are read from DRAM 210 by the read operations operation block 206. The choices of whether the more significant bits, less significant bits, or both are written or read may be independent between the write operations and the read operations.

Video data samples may be arranged in DRAM block 210 with the more significant bits of each sample formatted for efficient access. An exemplary format for arranging the more significant bits for efficient access may be found in U.S. Provisional Patent Application Ser. No. 60/472,182. For example, one 128-bit DRAM data word may contain an array of 8×2 video data samples of either luma or chroma values. In the case of luma, the 8 samples may be arranged so that they are horizontally adjacent, and the 2 samples may be arranged so that they are vertically adjacent within one field of video. In this regard, in the case of the chroma values, the 8 samples represent two chroma components such as, for example, $C_b$ and $C_r$ from 4 horizontally adjacent chroma samples, and the 2 samples are vertically adjacent within one video field.

The less significant bits of the video data samples may be formatted and arranged for efficient access in DRAM and so that they are separate from the more significant bits. In this regard, various formats may be utilized. Some exemplary formats are described hereinafter. In an exemplary embodiment of the invention, the less significant bits (LSBs) may be formatted so that one 128-bit DRAM word contains 2 LSBs per sample of 64 samples. The set of samples so represented may be 32 luma values and 32 chroma values, or they may be 42 luma values and 21 chroma values, or some other combination. The representation of 32 luma values and 32 chroma values may be appropriate for 4:2:2 video format, and the representation of 42 luma values and 21 chroma values may be appropriate for 4:2:0 video format.

In an embodiment of the present invention, where 32 luma values are utilized, these may be samples of an array of, for example, 8×4 samples, the 8 samples being horizontally adjacent and the 4 samples being vertically adjacent within one video field or within one video frame. Other one-dimensional (1D) or two-dimensional (2D) arrangements may be used for the luma and/or chroma values. In another exemplary embodiment of the invention, one DRAM word may contain the less significant bits of a number of luma samples, while another DRAM word may contain the less significant bits of a number of chroma samples. In each case, the samples may be organized into one-dimensional (1D) or two-dimensional (2D) arrays of samples.

When a video decoder is decoding video, the decoding operations are generally considered to be occurring in real time. Hence, there are time constraints within which the operations may need to be performed in order to assure that the operations are performed correctly. Similarly, the DRAM read and write accesses that are performed to support the decoding operations may also be real time, and as such they would have time constraints, referred to as deadlines. A decoding system such as a video decoding system may be designed so that the video decoding operations dynamically vary the way they access DRAM, based on an instantaneous real time performance of the DRAM system. For example, the system may be designed to access the more significant bits of the video samples within the deadlines for which the system is designed, while it may access the less significant bits of the video samples when this may be done without impairing the real time performance expected by other operations.

Dynamic performance may be achieved by designing the arbitration function associated with the DRAM sub-system so that the access to the more significant bits has a first priority, and access to the less significant bits has a second priority, which is lower than the first priority. In a priority based real time system, the lower priority may not perform all requested accesses within the operations' deadline under some conditions such as, for example, when higher priority operations make demands that may approach or reach the worst case for which the system is designed.

The video decoder may be designed so that when read operations of the less significant bits are not performed within a time limit, the values that would normally have been read from DRAM are not read, and instead they may be replaced with values, which may be generated internally by the decoding system. One exemplary method for not reading the less significant bits values may be performed by detecting that a request to read less significant bits from DRAM has not been granted before a time limit, and withdrawing the request. Replacing the values not read with internally generated values may be performed as illustrated in the following examples. If the less significant bits consist of 2 bits of an unsigned sample value, the replacement value may be '10' in base 2, i.e., a value between the minimum value that can be represented by the two bits ('00') and the maximum value ('11'). In another example, the replacement value may vary, for example in a pseudo-random pattern. One example of a pseudo-random pattern is the 2-bit pair 'xy', where 'y' is the least significant bit of the number representing the vertical position of the sample and 'x' is the result of an XOR operation performed on the least significant bit of the number representing the horizontal position of the sample in question and on 'y'. Such a pattern of bits is often referred to as dithering. Other dithering patterns and methods may be utilized instead.

A video decoder may be designed such that when write operations of the LSBs are not performed within a time limit, the values to be written are discarded. In the alternative, the LSBs values to be written may be stored temporarily such that they may be written to DRAM later when an opportunity arises, such as when system resources are available. In the latter case, the system may be designed so that if the set of LSBs values to be stored temporarily exceeds a limit of the amount of data that can be stored temporarily, the older values may be discarded as necessary to prevent discarding newer values.

A video decoder may decode video with all of the bits per sample that may be implied by the format, in real time under most conditions. The same DRAM subsystem may also be able to meet other real time demands simultaneously. Under some high demand conditions the video decoding function may scale back its access to DRAM in such a way that the resulting video may be acceptable for normal use, without causing problems in other real time functions. Accordingly, the system may be designed so that the instantaneous absolute worst case of all demands placed on DRAM may not be guaranteed, thereby reducing cost, while the system functions adequately under all conditions, including the instantaneous absolute worst case. This is better then conventional systems, which may be designed to ensure correct operation in worst-case scenarios making them more expensive, or alternatively they may not be designed to ensure correct operation in all real-world scenarios, making them not fully robust. In addition to video encoding and decoding, these considerations are also applicable to other systems such as graphics and audio processing.

Figure 3:
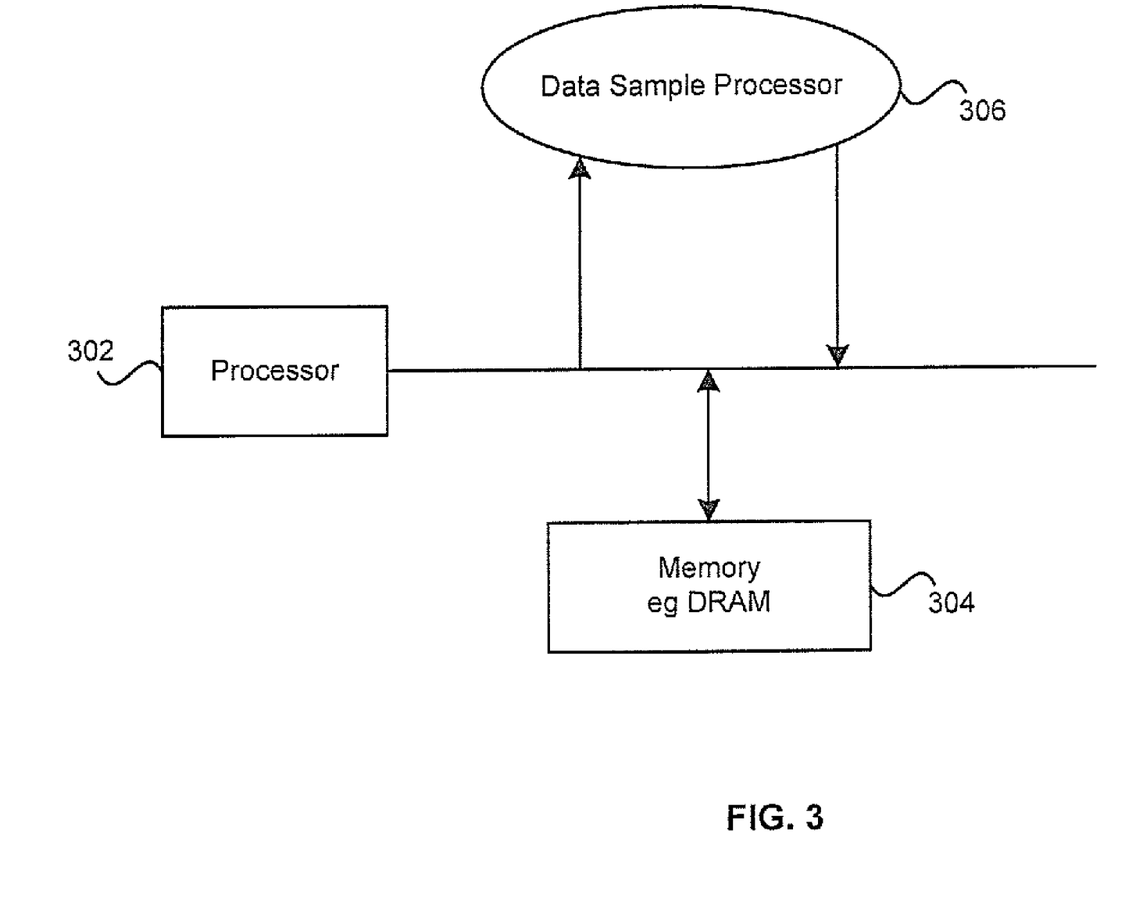
FIG. 3 is a block diagram of an exemplary system that may be utilized for processing data samples from a data sample processor in accordance with an embodiment of the invention.

FIG. 3 is a block diagram of an exemplary system that may be utilized for processing data samples from a data sample processor 306 in accordance with an embodiment of the invention. Referring to FIG. 3, there is shown a processor 302, a memory 304 and a data sample processor 306. The processor 302 may be any type of CPU, controller, micro controller or other similar type of processing device. The memory or memory subsystem 304 may be any type of random access device (RAM) such as a DRAM. The data sample processor 306 may be a data processing application and/or device that may be adapted to process data samples such as graphics, audio or video samples. The data sample processor 306 may be adapted to receive data that may be read from the memory 304 by the processor 302.

The processor 302 may be adapted to partition data samples received from data sample processor 306 into a first set of data bits and a second set of bits. The processor 302 may be adapted to utilize at least a portion of the first set of data bits and at least a portion of the second set of data bits while operating under a first condition. Only at least a portion of the first set of data bits may be utilized by the processor 302 while it is operating under a second condition. The first condition may be a normal operating condition, while the second condition may be a performance restricted condition. A performance restricted operation may, for example, be an operating condition in which bandwidth or other processing resources may be limited. The first set of bits may be referred to as more significant bits and the second set of bits may be referred to as less significant bits. The processor 302 may utilize at least a portion of the first set of data bits and at least a portion of the second set of data bits may be utilized while bandwidth is available. At least a portion of the first set of data bits may be utilized by the processor while bandwidth is limited. The first set of data bits may form a first data word, while the second set of data bits may form a second data word.

The processor 302 may be adapted to determine performance of a memory subsystem 304 and accordingly, choose for use, at least a portion of the first set of data bits along with at least a portion of the second set of data bits, or only at least a portion of the first set of data bits, based at least in part on the determined performance of the memory subsystem. This may also be based on whether the DRAM access is a read operation or a write operation. Additionally, the processor 302 may be configured to select at least a portion of the first set of data bits along with at least a portion of the second set of data bits, or only at least a portion of the first set of data bits based on one of a plurality of varying levels of system performance.

For operations which require reading from the memory 304, the processor 302 may read at least a portion of the first set of data bits and at least a portion of the second set of data bits while operating under the first condition. For memory read operations, at least a portion of the first set of data bits may be read from the memory 304 by the processor 3302 while operating under the second condition, while at least a portion of the second set of data bits may not be read by the processor while operating under the second condition. Other bits or words, which may be internally generated, may be substituted by the processor in place of the data bits that were not read.

For operations which require writing to the memory 304, the processor 302 may write at least a portion of the first set of data bits and the at least a portion of the second set of data bits to the memory 304 while it is operating under the first condition. In accordance with an embodiment of the invention, the first and the second conditions may vary between read and write operations. In an exemplary embodiment of the invention, write operations may be adapted to operate under the first condition, while concurrent read operations may be adapted to operate under the second condition. In this regard, in accordance with an embodiment of the invention, there may be separate first and second conditions for read and write operations. Also, for memory write operations, at least a portion of the first set of data bits may be written by the processor 302 while the processor 302 is operating under the second condition.

Certain embodiments of the invention provide a method and system for processing data samples. Aspects of the method may comprise partitioning the data samples in a first set of data bits and a second set of bits and utilizing at least a portion of the first set of data bits and at least a portion of the second set of data bits while operating under a first condition. Only at least a portion of the first set of data bits may be utilized while operating under a second condition. The first condition may be a normal operating condition, while the second condition may be a performance restricted condition. The first set of bits may be referred to as more significant bits and the second set of bits may be referred to as less significant bits. At least a portion of the first set of data bits and at least a portion of the second set of data bits may be utilized while bandwidth is available. At least a portion of the first set of data bits may be utilized while bandwidth is limited. The first set of data bits forms a first data word and the second set of data bits forms a second data word.

The method may further comprise determining performance of a memory subsystem and choosing for use, the at least a portion of the first set of data bits along with the at least a portion of the second set of data bits, or the only at least a portion of the first set of data bits, based on the determined performance of the memory subsystem. Additionally, the method may also comprise selecting the at least a portion of the first set of data bits along with the at least a portion of the second set of data bits, or only the at least a portion of the first set of data bits based on one of a plurality of varying levels of system performance.

For memory read operations, the method comprises reading the at least a portion of the first set of data bits and the at least a portion of the second set of data bits while operating under the first condition. For memory read operations, at least a portion of the first set of data bits may be read while operating under the second condition, while at least a portion of the second set of data bits may not be read while operating under the second condition. Other bits or words, which may be internally generated, may be substituted in place of the data bits that were not read. For memory write operations, at least a portion of the first set of data bits and the at least a portion of the second set of data bits may be written while operating under the first condition. For memory write operations, at least a portion of the first set of data bits may be written while operating under the second condition. In accordance with an embodiment of the invention, the first and the second conditions may vary between read and write operations. For example, write operations may be adapted to operate under the first condition, while concurrent read operations may be adapted to operate under the second condition.

Another embodiment of the invention may provide a machine-readable storage, having stored thereon, a computer program having at least one code section executable by a machine, thereby causing the machine to perform the steps as described above for processing data samples.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing data samples, the method comprising:
    partitioning the data samples in a first set of data bits and a second set of data bits;
    utilizing at least a portion of said first set of data bits and at least a portion of said second set of data bits while operating under a first condition, wherein said first condition is a higher performance operating condition; and
    utilizing only at least a portion of said first set of data bits while operating under a second condition, wherein said second condition is a lower performance operating condition.

2. The method according to claim 1, wherein said first set of data bits are more significant bits.

3. The method according to claim 1, wherein said second set of data bits are less significant bits.

4. The method according to claim 1, comprising utilizing said at least a portion of said first set of data bits and at least a portion of said second set of data bits while at least one of processor bandwidth and memory bandwidth are available.

5. The method according to claim 1, comprising utilizing said at least a portion of said first set of data bits while bandwidth is limited.

6. The method according to claim 1, comprising determining performance of a memory subsystem.

7. The method according to claim 6, comprising choosing for use, said at least a portion of said first set of data bits along with said at least a portion of said second set of data bits, or said only at least a portion of said first set of data bits based on said determined performance of said memory subsystem.

8. The method according to claim 1, comprising selecting said at least a portion of said first set of data bits along with said at least a portion of said second set of data bits, or said only at least a portion of said first set of data bits based on one of a plurality of varying levels of system performance.

9. The method according to claim 1, comprising, for memory read operations, reading said at least a portion of said first set of data bits and said at least a portion of said second set of data bits while operating under said first condition.

10. The method according to claim 9, comprising substituting during said second condition, internally generated bits for said second set of data bits that are read while operating under said first condition.

11. The method according to claim 1, comprising, for memory read operations, reading said only at least a portion of said first set of data bits while operating under said second condition.

12. The method according to claim 1, comprising, for memory write operations, writing said at least a portion of said first set of data bits and said at least a portion of said second set of data bits while operating under said first condition.

13. The method according to claim 1, comprising, for memory write operations, writing said only at least a portion of said first set of data bits while operating under said second condition, wherein memory read operations and memory write operations occur under at least one of said first condition and said second condition.

14. The method according to claim 1, wherein said first set of data bits forms a first data word.

15. The method according to claim 1, wherein said second set of data bits forms a second data word.

16. A machine-readable storage having stored thereon, a computer program having at least one code section for processing data samples, the at least one code section being executable by a machine for causing the machine to perform steps comprising:
    partitioning the data samples in a first set of data bits and a second set of data bits;
    utilizing at least a portion of said first set of data bits and at least a portion of said second set of data bits while operating under a first condition, wherein said first condition is a higher performance operating condition; and
    utilizing only at least a portion of said first set of data bits while operating under a second condition, wherein said second condition is a lower performance operating condition.

17. The machine-readable storage according to claim 16, wherein said first set of data bits are more significant bits.

18. The machine-readable storage according to claim 16, wherein said second set of data bits are less significant bits.

19. The machine-readable storage according to claim 16, comprising code for utilizing said at least a portion of said first set of data bits and at least a portion of said second set of data bits while at least one of processor bandwidth and memory bandwidth is available.

20. The machine-readable storage according to claim 16, comprising code for utilizing said at least a portion of said first set of data bits while bandwidth is limited.

21. The machine-readable storage according to claim 16, comprising code for determining performance of a memory subsystem.

22. The machine-readable storage according to claim 21, comprising code for choosing for use, said at least a portion of said first set of data bits along with said at least a portion of said second set of data bits, or said only at least a portion of said first set of data bits based on said determined performance of said memory subsystem.

23. The machine-readable storage according to claim 16, comprising code for selecting said at least a portion of said first set of data bits along with said at least a portion of said second set of data bits, or said only at least a portion of said first set of data bits based on one of a plurality of varying levels of system performance.

24. The machine-readable storage according to claim 16, comprising code for memory reading operations that reads said at least a portion of said first set of data bits and said at least a portion of said second set of data bits while operating under said first condition.

25. The machine-readable storage according to claim 24, comprising code for substituting during said second condition, internally generated bits for said second set of data bits that are read while operating under said first condition.

26. The machine-readable storage according to claim 16, comprising code for memory reading operations that reads said only at least a portion of said first set of data bits while operating under said second condition.

27. The machine-readable storage according to claim 16, comprising code for memory writing operations that writes said at least a portion of said first set of data bits and said at least a portion of said second set of data bits while operating under said first condition.

28. The machine-readable storage according to claim 16, comprising code for memory writing operations that writes said only at least a portion of
said first set of data bits while operating under said second condition, wherein memory reading operations and memory writing operations occur under at least one of said first condition and said second condition.

29. The machine-readable storage according to claim 16, wherein said first set of data bits forms a first data word.

30. The machine-readable storage according to claim 16, wherein said second set of data bits forms a second data word.

31. A system for processing data samples, the system comprising:
at least one processor operable to partition the data samples in a first set of data bits and a second set of data bits;
said at least one processor operable to utilize at least a portion of said first set of data bits and at least a portion of said second set of data bits while operating under a first condition, wherein said first condition is a higher performance operating condition; and
said at least one processor operable to utilize only at least a portion of said first set of data bits while operating under a second condition, wherein said second condition is a lower performance operating condition.

32. The system according to claim 31, wherein said first set of data bits are more significant bits.

33. The system according to claim 31, wherein said second set of data bits are less significant bits.

34. The system according to claim 31, wherein said at least one processor is operable to utilize said at least a portion of said first set of data bits and at least a portion of said second set of data bits while at least one of processor bandwidth and memory bandwidth are available.

35. The system according to claim 31, wherein said at least one processor is operable to utilize said at least a portion of said first set of data bits while bandwidth is limited.

36. The system according to claim 31, wherein said at least one processor is operable to determine performance of a memory subsystem.

37. The system according to claim 36, wherein said at least one processor is operable to choose for use, said at least a portion of said first set of data bits along with said at least a portion of said second set of data bits, or said only at least a portion of said first set of data bits based on said determined performance of said memory subsystem.

38. The system according to claim 31, wherein said at least one processor is operable to select said at least a portion of said first set of data bits along with said at least a portion of said second set of data bits, or said only at least a portion of said first set of data bits based on one of a plurality of varying levels of system performance.

39. The system according to claim 31, wherein said at least one processor is operable to, for memory read operations, read said at least a portion of said first set of data bits and said at least a portion of said second set of data bits while operating under said first condition.

40. The system according to claim 39, wherein said at least one processor is operable to substitute during said second condition, internally generated bits for said second set of data bits that are read while operating under said first condition.

41. The system according to claim 31, wherein said at least one processor is operable to, for memory read operations, read said only at least a portion of said first set of data bits while operating under said second condition.

42. The system according to claim 31, wherein said at least one processor is operable to, for memory write operations, write said at least a portion of said first set of data bits and said at least a portion of said second set of data bits while operating under said first condition.

43. The system according to claim 31, wherein said at least one processor is operable to, for memory write operations, write said only at least a portion of said first set of data bits while operating under said second condition, wherein memory read operations and memory write operations occur under at least one of said first condition and said second condition.

44. The system according to claim 31, wherein said first set of data bits forms a first data word.

45. The system according to claim 31, wherein said second set of data bits forms a second data word.

* * * * *